United States Patent
Su et al.

(10) Patent No.: US 10,740,996 B2
(45) Date of Patent: Aug. 11, 2020

(54) APPARATUS AND METHOD FOR CHECKING THE AUTHENTICITY OF A SECURITY ELEMENT

(71) Applicant: GIESECKE+DEVRIENT CURRENCY TECHNOLOGY GMBH, Munich (DE)

(72) Inventors: Shanchuan Su, Neubiberg (DE); Norbert Holl, Germering (DE)

(73) Assignee: GIESECK+DEVRIENT CURRENCY TECHNOLOGY GMBH, Munich (DE)

( * ) Notice: Subject to any disclaimer, the term of this patent is extended or adjusted under 35 U.S.C. 154(b) by 29 days.

(21) Appl. No.: 16/099,823

(22) PCT Filed: May 11, 2017

(86) PCT No.: PCT/EP2017/000573
§ 371 (c)(1),
(2) Date: Nov. 8, 2018

(87) PCT Pub. No.: WO2017/194190
PCT Pub. Date: Nov. 16, 2017

(65) Prior Publication Data
US 2019/0114864 A1 Apr. 18, 2019

(30) Foreign Application Priority Data
May 13, 2016 (DE) ........................ 10 2016 005 923

(51) Int. Cl.
*G07D 7/00* (2016.01)
*G01N 21/86* (2006.01)
(Continued)

(52) U.S. Cl.
CPC ............. *G07D 7/003* (2017.05); *G01N 21/86* (2013.01); *G07D 7/12* (2013.01); *B42D 25/351* (2014.10);
(Continued)

(58) Field of Classification Search
CPC ........... G01N 21/86; G01N 2021/8663; G07D 2201/00
See application file for complete search history.

(56) References Cited

U.S. PATENT DOCUMENTS 8,107,712 B2  1/2012 Holl
8,965,099 B2  2/2015 Koretsune et al.
(Continued)

FOREIGN PATENT DOCUMENTS

| DE | 10243051 A1 | 3/2004 |
|---|---|---|
| DE | 102011116487 A1 | 4/2013 |
| WO | 2014075796 A1 | 5/2014 |

OTHER PUBLICATIONS

German Search Report from DE Application No. 102016005923.0, dated Feb. 10, 2017.
(Continued)

*Primary Examiner* — Dominic J Bologna
(74) *Attorney, Agent, or Firm* — Workman Nydegger (57) ABSTRACT

An apparatus and method are provided for checking the authenticity of the security element of a value document. For checking the authenticity of the security element, reversed bright/dark modulation is examined. For this purpose, for determining a combination course, the remission course and the transmission course along the longitudinal direction of the security element are set off against each other pixel by pixel and the combination course obtained by setting off
(Continued)

pixel by pixel is checked with regard to an intensity modulation along the longitudinal direction of the security element.

17 Claims, 3 Drawing Sheets

(51) Int. Cl.
  *G07D 7/12* (2016.01)
  *B42D 25/351* (2014.01)
  *B42D 25/355* (2014.01)
(52) U.S. Cl.
  CPC .... *B42D 25/355* (2014.10); *G01N 2021/8663* (2013.01); *G07D 2207/00* (2013.01)

(56) References Cited

U.S. PATENT DOCUMENTS

| 9,279,772 | B2 | 3/2016 | Sacquard et al. |
| 9,685,020 | B2 | 6/2017 | Su |
| 2006/0140468 | A1* | 6/2006 | Holl ........................ G07D 7/121 |
| | | | 382/135 |
| 2013/0016893 | A1* | 1/2013 | Koretsune .............. G07D 7/121 |
| | | | 382/137 |
| 2014/0246611 | A1* | 9/2014 | Sacquard ............... G01N 21/15 |
| | | | 250/559.1 |
| 2016/0292951 | A1* | 10/2016 | Su ........................... G07D 7/06 |

OTHER PUBLICATIONS

International Search Report from PCT Application No. PCT/EP2017/000573, dated Aug. 23, 2017.

\* cited by examiner

APPARATUS AND METHOD FOR CHECKING THE AUTHENTICITY OF A SECURITY ELEMENT

BACKGROUND

The invention relates to an apparatus and a method for checking the authenticity of a security element, e.g. of the security element of a value document, as well as to a value-document processing apparatus having the apparatus for checking the authenticity of the security element.

In bank note processing systems properties of bank notes, such as e.g. printed image, face value, authenticity and soiling are ascertained, by physical properties of the bank notes being captured by means of sensors and the sensor data generated hereby being evaluated by means of algorithms.

For example, for checking the authenticity of security elements it is known to capture the transmission image of a security thread located on a bank note and to check the security thread for characters, so-called cleartext contained therein. Here, one makes use of the fact that in the transmission image the security thread usually appears dark or black, while at the places at which the gaps of the incorporated characters are located illumination light passes through and consequently the characters appear bright in transmission.

Additionally, there are also known security elements, e.g. security threads, which show to the viewer, when moving the security element, e.g. upon tilting the bank note, an optically variable effect, e.g. an optical movement effect or an enlargement effect. The optically variable effect of these security threads is generated, for example, by a microlens grid and a motif located therebehind, e.g. a grid-shaped pattern or characters disposed in grid-shaped fashion. They are designated as, e.g. security threads with "moiré effect" or with "modulo enlargement" or "motion threads". The optical variable effect is provided for an authenticity check of the security element by the human viewer.

For checking such security threads by machine it is known from U.S. Pat. No. 8,965,099 B2 to examine with the help of an optical sensor whether the expected optically variable effect can actually be detected. For this, a bank note with a motion security thread is illuminated from at least two particular angles of incidence and from a suitable angle a remission image is recorded, accordingly two different motifs being detected. The two remission images are subtracted from each other and the difference values are added up. If—as in a forgery—from both angles the same pictures are detected, the difference values are zero and the sum accordingly is also zero. Only in the authentic motion security thread, the two remission images differ from each other, so that the calculated sum of the difference values exceeds a threshold. In this manner it is examined whether from the different angles there result different motifs in remission.

It is disadvantageous that in this method for different security threads having different microlens grids the necessary illumination/detection angles under which the motifs must be detected do vary. Hence, for different security threads different sensors are necessary. Additionally, for recognizing the motifs a high optical resolution of the sensor is required.

SUMMARY

Hence, it is an object of the present invention to state a method, an apparatus with which such security elements which show an optically variable effect can be examined for their authenticity in a simple and still reliable fashion.

In the transmission image of a value document, security threads usually appear continuously dark or black, and a light transmission at most takes place through the cleartext characters configured as gaps in the security thread. With the help of the transmission image, hence, usually merely the position of the security thread within the value document is ascertained. As printed motifs of the security thread are not visible in transmission, the transmission image is usually not used for checking the authenticity of security threads.

Now, prior to the invention it was unexpectedly found that window security threads with optically variable effect, which are equipped with microlenses or similar optical elements, do not appear continuously dark in the transmission image, but have a bright/dark modulation. With bright/dark modulation the portions of the security thread not embedded in the paper but located in the windows appear strikingly bright in the transmission image. In contrast, the portions therebetween in which the security thread is embedded in the paper appear dark. These bright portions are especially distinct in the infrared transmission image of the value document, because in the visible it comes to a partial absorption of the light by the printed image of the value document, in case such a printed image overlaps with the security element. These bright portions in the windows are ascribed to an optical effect of optical elements (e.g. of the microlenses) of the security thread, which deflect the incident light in dependence on the angle of incidence and direct an increased intensity to the opposing detector. The remission image of such a security element also has a bright/dark modulation, but exactly reversed to the transmission image, the portions of the security element embedded in the paper appear bright and the portions in the windows in which the security element is openly visible appear dark. Forged security elements, however, which for simulating the window security thread consist of a print with bright/dark modulation, in contrast, do not have a mutually reversed bright/dark modulation in remission and transmission.

In the method according to the invention this reversed bright/dark modulation in remission and transmission is examined for checking the authenticity of the security element. For checking the authenticity of the security element, the electromagnetic radiation transmitted through the security element and remitted by the security element is captured with the help of at least one sensor and a remission course corresponding to the remitted intensity and a transmission course corresponding to the transmitted intensity is generated along the longitudinal direction of the security element. For checking the authenticity of the security element, the following steps are carried out:

a) the remission course and the transmission course are set off against each other pixel by pixel along the longitudinal direction of the security element for determining a combination course, in particular are added to each other pixel by pixel and/or subtracted from each other pixel by pixel, and b) the combination course obtained by the pixel-wise setting off is checked with regard to an intensity modulation along the longitudinal direction of the security element, in particular with regard to the presence of an intensity modulation and/or with regard to a level of the intensity modulation, and c) checking the authenticity of the security element is carried out, during which the authenticity of the security element is evaluated in dependence on the intensity modulation of the combination course.

Here, in particular the presence or vanishing of the intensity modulation and/or the level of the intensity modulation of the combination course is used as a criterion for the authenticity of the security element. Depending on the invention variant, either the intensity modulation of the combination course or the weakening or elimination of the intensity modulation of the combination course can be drawn on for checking the authenticity of the security element. The security element is checked with regard to the intensity modulation of the combination course, but, however, no two-dimensional image evaluation of the security element with regard to the check of the optically variable effect of the security element needs to be effected.

In particular, the security element is a window security element which is at least partly light-transmissive. For example, the security element has a microlens grid. If the security element is a window security thread with microlens grid, the remission course and the transmission course are detected and evaluated in the region of the microlens grid of the security element. The combination course obtained in the region of the microlens grid is evaluated with regard to an intensity modulation and used for checking the authenticity of the security element.

However, the invention is by no means limited to checking the authenticity of window security threads having microlens grid, but is suited for any security elements having the above-described reversed bright/dark modulation in remission and transmission. For example, the security element can also be formed non-thread-shaped, e.g. with a lower length/width ratio. Also, the security element does not need to be (periodically) embedded in the interior of the value document substrate, but it could also be visible alternating at the two opposing value document top sides. The security element can be a window security element of a value document. The value document is, e.g. a bank note, a card, an identity card or a security document.

The remission and transmission course respectively have, along the one dimension, a values range of a multiplicity of different intensity values. The values range may continuously or discretely consist of a multiplicity of possible (analog or digital) intensity values. For every position along the longitudinal direction an intensity value is generated which corresponds to the electromagnetic radiation captured at this position.

The invention has the advantage that the remission and transmission course are evaluated along only one dimension of the security element. Instead of subjecting the image detail of the security element to a complex image evaluation, according to the invention, thus, merely the captured intensity course of the electromagnetic radiation emanating from the security element along the longitudinal direction of the security element is examined. The invention thus allows an optical examination of security elements provided with microlenses, for example of a window security thread provided with a microlens, without the necessity that the optical resolving power of the sensor respectively used, including optics, if any, has to be so great that it can resolve the characters/patterns located behind the microlenses. Rather, the resolving power of the sensor used according to the invention can be smaller than the resolving power required for a recognition of such characters. The invention thus allows the security element located on the value document to be checked in a reliable manner, but with a lower expenditure.

Preferably, for both the transmission course and the remission course the electromagnetic radiation in the infrared spectral region captured from the security element is used. This allows the modulation of the intensity course along the one longitudinal direction of the security element to be captured with particularly high reliability. However, alternatively or additionally it can also be provided to detect ultraviolet and/or visible radiation emanating from the security element and to evaluate it according to the invention.

With a first variant of the invention, for determining the combination course, the remission course and the transmission course along the longitudinal direction of the security element are added to each other pixel by pixel ("compensation"). In this case, upon checking the authenticity of the security element, the security element will be evaluated as authentic when the combination course along the longitudinal direction of the security element has no or a vanishingly low intensity modulation (e.g. undershoots a particular threshold), and the security element will be evaluated as false when the combination course along the longitudinal direction of the security element has a (significant) intensity modulation (e.g. which exceeds the particular threshold).

With a second variant of the invention, for determining the combination course, the remission course and the transmission course along the longitudinal direction of the security element are subtracted from each other pixel by pixel ("inversion"). In this case, upon checking the authenticity of the security element, the security element will be evaluated as false when the combination course along the longitudinal direction of the security element has no or a vanishingly low intensity modulation (e.g. undershoots a particular threshold), and the security element will be evaluated as authentic when the combination course along the longitudinal direction of the security element has a (significant) intensity modulation (e.g. which exceeds the particular threshold).

For the remission course of the security element of a value document there can be used a detail of a remission image over the full area of the value document. Alternatively, instead there can also be recorded only the remission image of a partial region of the value document in which the security element to be checked is disposed. Analogously, the transmission course can also be a detail from a transmission image over the full area, or only the transmission image of a partial region of the value document is recorded, in which the security element to be checked is disposed. The transmission course is preferably a transmission course detected within the framework of a dark-field transmission measurement.

For the remission course or transmission course there is used, e.g. the course of the remission or transmission detected in the middle of the security thread along the longitudinal direction of the security thread. In addition, an image detail can be used which has a width of one or several pixels in the direction perpendicular to the longitudinal direction. For example, the remission image or transmission image of a stripe of a few pixels width is combined in the middle of the security thread into one single remission course or transmission course, e.g. by averaging the intensity of some pixels lying side by side (perpendicular to the longitudinal direction of the security element).

Preferably, prior to the start of checking the authenticity the identity of the value document is determined and upon checking the authenticity of the security element the steps a), b) and c) are carried out in dependence on the identity of the value document. If the identity check yields that the respective value document has window security element with optically variable effect, e.g. a window security element equipped with a microlens grid, upon checking the authenticity of the security element the mentioned steps a), b) and c) are carried out. And if the identity check yields that the respective value document has no such security element (e.g. equipped with a microlens grid), the steps a), b) and c) are not carried out.

In particular, prior to the carrying out of the steps a), b) and c) the remission course and/or the transmission course can be checked as to whether the intensity modulation thereof exceeds a particular minimum modulation amplitude. If the remission course and/or the transmission course exceeds the minimum modulation amplitude, for checking the authenticity of the security element the mentioned steps a), b) and c) are carried out, otherwise the security element is evaluated as false. By this pre-check it can be ensured that the remission and/or transmission course actually have the expected bright/dark modulation.

In a first embodiment example, the combination course is checked for an intensity modulation in that the standard deviation of the combination course along the longitudinal direction of the security element is determined and this standard deviation is compared with a threshold. In dependence on whether the standard deviation exceeds the threshold or does not exceed it, the security element is evaluated as authentic or false. In the case that the combination course is determined by adding pixel by pixel the remission course and the transmission course along the longitudinal direction of the security element to each other ("compensation"), the standard deviation is compared with a threshold upon whose exceeding the security element is evaluated as false and upon whose non-exceeding the security element is evaluated as authentic. In the case that the combination course is determined by subtracting from each other pixel by pixel the remission course and the transmission course along the longitudinal direction of the security element ("inversion"), the standard deviation is compared with a threshold upon whose exceeding the security element is evaluated as authentic and upon whose non-exceeding the security element is evaluated as false.

In a second embodiment example, from the remission and transmission course there is respectively ascertained a binary remission and transmission course along the longitudinal direction of the security element, upon which the remission and transmission course along the longitudinal direction of the security element respectively have only two different intensity values. The check of the security element with the help of the binary remission and transmission course can be carried out substantially more reliable than a comparison of the original (non-binary) remission and transmission course, because the original remission and transmission course depends on the state of the value document, while the binary remission and transmission course is independent of the state of the value document.

In this embodiment example, the remission course and transmission course used for determining the combination course, whose intensity values are set off against each other pixel by pixel, are a binary remission course and a binary transmission course, respectively. From the remission course and from the transmission course there is respectively calculated, by binarizing, a binary remission course and a binary transmission course which respectively have only two different intensity values along the longitudinal direction of the security element, and for determining the combination course, the binary remission course is then set off pixel by pixel against the binary transmission course in the longitudinal direction of the security element. For example, for binarizing the remission course and the transmission course, there is respectively determined a remission mean value of the remission course and a transmission mean value of the transmission course along the longitudinal direction of the security element and the binary remission course is obtained by comparing pixel by pixel the remission course with the remission mean value and the binary transmission course by comparing pixel by pixel the transmission course with the transmission mean value. Thus, each pixel of the remission course or of the transmission course whose intensity value achieves or exceeds the respective mean value is assigned a first binary intensity value, and each pixel whose intensity value does not exceed the respective mean value is allocated a second binary intensity value.

The combination course calculated from the binary remission course and the binary transmission course can be checked for its intensity modulation in that pixel by pixel the sum of the intensity values of the combination course along the longitudinal direction of the security element is calculated and compared with a threshold and the security element is evaluated as false or authentic in dependence on whether the calculated sum exceeds a threshold or does not exceed it.

Optionally, here, the sum of the intensity values of the combination course along the longitudinal direction of the security element can be normalized to the length of the security element and the sum normalized to the length of the security element can be compared with a threshold, the security element being evaluated as false or authentic in dependence on whether the normalized sum exceeds a threshold or does not exceed it. In the case, when the combination course is calculated by adding the binary remission course and the binary transmission course, the security element is evaluated as false when the normalized sum exceeds a particular threshold, and the security element is evaluated as authentic when the normalized sum does not exceed the particular threshold. And in the case, when the combination course is calculated by mutually subtracting the binary remission course and the binary transmission course, the security element is evaluated as false when the normalized sum does not exceed a particular threshold, and the security element is evaluated as authentic when the normalized sum exceeds the particular threshold. Normalizing has the advantage that the same threshold can be used universally for security elements of different lengths.

Preferably, for determining a first combination course $I(x)=R(x)-T(x)$, the remission course and the transmission course along the longitudinal direction of the security element are subtracted from each other pixel by pixel and additionally added to each other pixel by pixel for determining the second combination course $K(x)=R(x)+T(x)$. Both, the first and the second combination course are checked with regard to their intensity modulation and the authenticity of the security element is evaluated in dependence on the intensity modulation of the first combination course and in dependence on the intensity modulation of the second combination course. With the help of these combination courses the checking the authenticity of the security element becomes even more reliable.

In the first embodiment example, for the first combination course a first standard deviation is determined, and for the second combination course a second standard deviation is determined, and the authenticity of the security element is evaluated in dependence on the first and second standard deviation. For example, the authenticity of the security element can be evaluated in dependence on the difference of the first and second standard deviation. When this difference exceeds a particular threshold, the security element is evaluated as authentic, and when this difference does not exceed the particular threshold, the security element is evaluated as false.

Alternatively or additionally to these two embodiment examples, the combination course, in particular the first and/or the second combination course, can also be checked for its intensity modulation in that a location dependence of the respective combination course along the longitudinal direction of the security element is compared with a location dependence expected for the security element, and in dependence on the similarity of these location dependencies the security element is evaluated as authentic or false. In case of a sufficient similarity of the detected location dependence with the expected location dependence, the security element is evaluated as authentic, and in case of a too great deviation between the detected location dependence and the expected one, the security element is evaluated as false. Comparing the detected location dependence with the expected one can be carried out e.g. by comparing patterns, by calculating the distance or by means of correlation. Prior to the comparison, there can be effected a relative shift of the two location dependencies along the longitudinal direction of the security element.

In the case of the binary remission course and the binary transmission course, the first and second combination course calculated from the binary remission course and the binary transmission course can be checked for their intensity modulation in that a first sum $\Sigma((R(x)-(T(x)))$ is calculated by addition of the intensity values of the first combination course and a second sum $\Sigma(R(x)+T(x))$ is calculated by addition of the intensity values of the second combination course, and the authenticity of the security element is evaluated in dependence on the first and second sum. The security element is then evaluated as false, when the first sum does not exceed a first threshold and/or the second sum exceeds the second threshold, and as authentic only when both the first sum exceeding this first threshold and the second sum not exceeding this second threshold is the case. For the first and second threshold there can be used the same threshold or two different thresholds.

Optionally, in the case that the security element has an intensity modulation, there can be additionally examined the period of the intensity modulation, this being compared with a period to be expected for the respective security element. The period of the intensity modulation is ascertained preferably with the help of the binary remission course, and/or with the help of the binary transmission course, and/or with the help of the binary combination course which is yielded by subtracting the remission course and the transmission course from each other.

The apparatus according to the invention for checking the authenticity of the security element has: at least one sensor for capturing electromagnetic radiation emanating from along the longitudinal direction of a security element and for generating a remission and transmission course along the one dimension of the security element corresponding to the intensity of the captured electromagnetic radiation, and an evaluation device which is configured, e.g. is accordingly programmed, for checking the authenticity of the security element according to the method described above.

The apparatus can have respectively one sensor for remission and one sensor for transmission, e.g. an image sensor for generating a remission image and one further image sensor for generating the transmission image of the value document. In addition, another image sensor can be used to also generate a further remission course of the opposing side of the value document. The remission image and the transmission image can be recorded statically (i.e. with the resting value document) or during a transport of the value document.

For the remission course along the longitudinal direction of the security element, the remission course detected from one side of the value document can be used. Alternatively, for the remission course there can also be used pixel by pixel the sum of the intensities of the intensity remitted by the two opposing sides of the security element.

Alternatively, the apparatus can also have one single sensor, e.g. image sensor, which detects the remission course as well as the transmission course, e.g. successively by alternately illuminating the value document from the two opposing sides. For this, two illumination devices on the two opposing sides of the value document are used. With the two illuminations the value document is illuminated in the same region respectively alternately, which is realized via a corresponding control of the two illumination devices. Now, the only image sensor accordingly measures alternately the light radiated by the first illumination device onto the value document and remitted thereof and the light radiated by the second illumination device onto the opposing side on the value document and transmitted through the value document. Here, the illumination cycle is selected to be so fast, relative to the cycle of detection, that at each measuring site along a measuring track both an intensity signal for the remission image and an intensity signal for the transmission is measured. I.e., again, for each individual value document there are present full-area images of the intensity values regarding the remission and the transmission.

The value-document processing apparatus according to the invention is e.g. an apparatus for processing, in particular for checking and/or counting and/or sorting, value documents, in particular bank notes.

For checking the authenticity of the value documents to be processed, the value-document processing apparatus has an apparatus of the invention for checking the authenticity of the security element of the value documents. For example, the security elements of the value documents are checked for their authenticity during the value document processing by the value-document processing apparatus with the help of the apparatus of the invention.

BRIEF DESCRIPTION OF THE DRAWINGS

Further advantages, features and application possibilities of the present invention will result from the subsequent description in connection with the figures. There are shown.

DETAILED DESCRIPTION OF VARIOUS EMBODIMENTS

Figure 1:
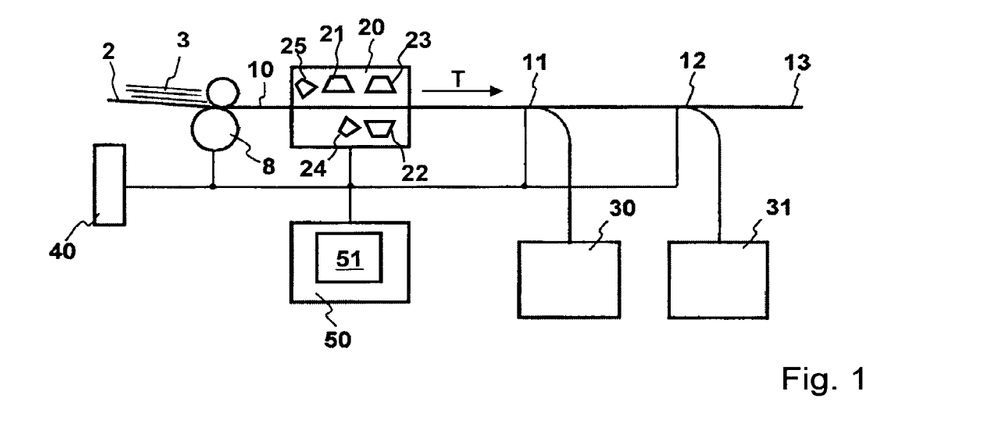
FIG. 1 an example of a schematic structure of a value-document processing apparatus.

FIG. 1 shows an example of a schematic structure of a value-document processing apparatus 1 having an input pocket 2 in which a stack of value documents to be processed, in particular bank notes 3, is provided, and a singler 8 by which respectively one (e.g. respectively the lowest) bank note of the input stack is successively grasped and transferred to a—in the selected representation only schematically reproduced—transport device 10 which conveys the bank note in the transport direction T to a sensor device 20.

The sensor device 20 comprises in the represented example a first, second and third sensor 21, 22, 23 which are respectively configured as so-called line-scan cameras and capture light emanating from the bank note by means of sensor elements arranged along a line, in particular in the visible and/or infrared and/or ultraviolet spectral region, and convert it into corresponding sensor signals.

In the represented example, the first and second sensors 21 or 22 capture light that is remitted, i.e. diffusely and/or directly reflected, by the front side or back side of the bank note. The illumination of the bank note is effected by means of light sources 24, 25 arranged on both sides of the bank note. The third sensor 23 located in the region of the front side of the bank note captures the light emitted by the light source 24, incident preferably oblique on the bank note and passing, i.e. transmitting, through the bank note. The sensors 21-23 convert the detected light into corresponding sensor signals. Hence, the first and second sensors 21 or 22 are also referred to as remission sensors and, hence, the third sensor 23 is also referred to as dark-field transmission sensor.

Preferably, the line with the sensor elements of the respective sensor 21, 22 or 23 extends substantially perpendicular to the transport direction T of the bank notes, so that with every readout operation of the sensor line of the respective sensor 21, 22 a remission course or at the sensor 23 a transmission course along the sensor line is obtained. This corresponds to the intensity course of the light which is remitted or transmitted by the bank note in a direction x extending perpendicular to the transport direction T. The sensor signals, in particular the remission course and the transmission course, generated by the sensors 21 to 23 of the sensor device 20 are forwarded to a control device 50 and an evaluation device 51. The evaluation device 51 can be contained in the control device 50, or else form a unit separate from the control device 50. Alternatively, the evaluation device 51 can also be integrated in the sensor device 20.

In the evaluation device 51, the sensor signals are used, after a possible pre-processing, for checking the bank note, from the respective sensor signals statements about different properties of the respective bank note being derived, such as e.g. face value, emission, location, length and width, infrared properties, watermarks, presence or properties of security elements, such as e.g. security threads and/or holograms, holes, tears and missing parts, degree of soiling, dog's-ears, spots, graffiti as well as colorings over the entire area, abrasion of the printing ink, and serial number.

Depending on the properties of the respective bank note that are ascertained in the evaluation device 51, the transport device 10 as well as the gates 11 and 12 along the transport line are controlled by the control device 50 such that the bank note is fed to one of a plurality of output pockets 30 and 31 and deposited there. For example, bank notes that were recognized as authentic are placed in a first output pocket 30, while bank notes classified as false or suspect are placed in a second output pocket 31. The authenticity of the bank notes is evaluated here in dependence on several authenticity criteria, one of these authenticity criteria being the subsequently described intensity modulation of the combination course of the window security elements. Only if all authenticity criteria are satisfied, the respective bank note is evaluated as authentic and sorted into the first output pocket 30.

The reference number 13 at the end of the represented transport path shall indicate that further output pockets and/or other devices, for example for the storage or destruction of bank notes, can be provided, such as e.g. cassettes for the protected storage of the bank notes or a shredder. If, for example, a bank note could not be recognized, a special output pocket can be provided therefor, in which such bank notes are placed and provided for a separate treatment, for example by an operator.

The value-document processing apparatus 1 further comprises, in the represented example, an input/output device 40 for inputting data and/or control commands by an operating person, for example by means of a keyboard or a touchscreen, and outputting or displaying data and/or information about the processing operation, in particular about the respectively processed bank notes.

The value-document processing apparatus 1 is particularly suitable for checking security elements located on value documents, such as e.g. security threads, for their authenticity in order to enable conclusions on the authenticity of the respective value document. This is explained in more detail in the following.

Figure 2:
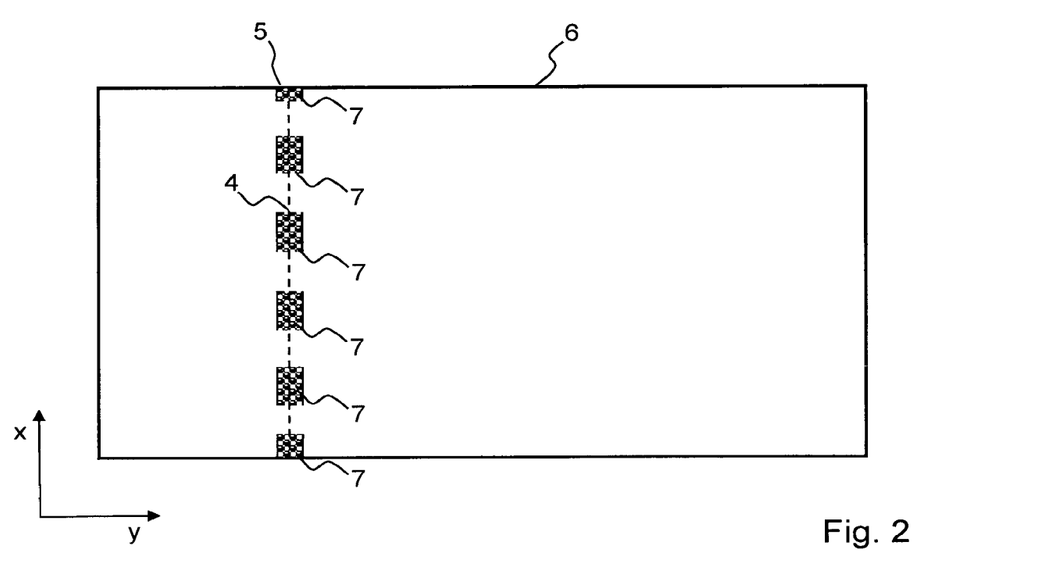
FIG. 2 an example of a value document in the form of a bank note provided with a window security thread.

FIG. 2 shows an example of a value document in the form of a bank note 6 which is provided with a security element 5. In the shown example, the security element 5 is a window security thread 5 which in the present example with its longitudinal direction extends along a first dimension x parallel to the narrow side of the bank note 6. The security thread 5 is partially embedded in the bank note substrate. At the windows 7 the security thread 5 lies above the substrate and is visible to the viewer. At the places located between the windows 7 there is located the security thread 5 within the bank note substrate, e.g. between two paper plies, so that there, in remission, it is not or only very weakly visible.

For increasing its forgery resistance the security thread 5 has an optically variable effect which is observable to the human viewer upon tilting the bank note 6. The optically variable effect is generated by a grid made of microlenses behind which there is located a suitable motif, e.g. characters or patterns or parts thereof likewise printed in grid-shaped fashion.

With the sensors 21, 22, 23 the light emanating along a dimension of the respective security element 5 is captured, for example by detection of the remission image and the transmission image of the bank note 6. From the captured remission image of the sensor 21 and/or the sensor 22 there is determined the remission course and from the transmission image of the sensor 23 the transmission course along the longitudinal direction of the security thread 5. This remission course and transmission course are fed to the evaluation device 51 and analysed there for the purpose of checking the authenticity of the security thread 5 or of the bank note 6. Preferably, for the remission or transmission course there is used the intensity remitted or transmitted in the region of the center of the security thread 5. The sensor line of the corresponding sensors 21, 22 or 23 (see FIG. 1) here extends substantially along the center line 4 of the security thread 5, which is indicated in dashed lines in FIG. 2.

Figure 3A:
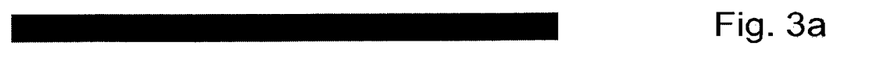
FIGS. 3a to 3c examples of the transmission image observed from a conventional security thread (FIG. 3a) and a window security thread with microlenses (FIG. 3b), and of the remission image of the same (FIG. 3c), FIGS. 4a to 4d the transmission course (FIG. 4a), the remission course (FIG. 4b), and a first (FIG. 4c) and second (FIG. 4d) combination course for the window security thread of FIGS. 3b and 3c, FIGS. 5a to 5d the binarized transmission course (FIG. 5a), the binarized remission course (FIG. 5b) and a first (FIG. 5c) and second (FIG. 5d) combination course for the window security thread of FIGS. 3b and 3c calculated from these binary courses.

In FIG. 3a there is outlined the infrared transmission image of a conventional security thread which typically has a light-non-transmissive metal layer, but no microlens grid or the like. On account of the metal layer the conventional security thread appears black in transmission.

Figure 3B:
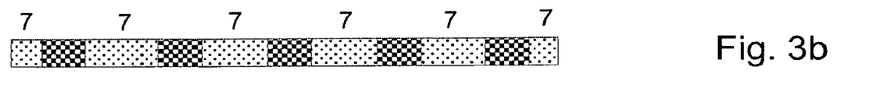

FIG. 3b outlines the infrared transmission image of a partly light-transmissive window security thread which has no such metal layer but is equipped with a microlens grid. For representing the different intensities, FIG. 3b and FIG. 3c use hatching with different dot density instead of shades of grey. In contrast to the conventional security thread, this security thread appears not continuously black in the infrared transmission image but has a significant bright/dark modulation. At the windows 7 the window security thread has an increased transmission intensity in comparison to the regions lying between the windows which seem relatively dark. The strength of the bright/dark modulation depends on the quality of the security thread, on the embedding of the security thread in the value document substrate and on the detected spectral region.

Figure 3C:
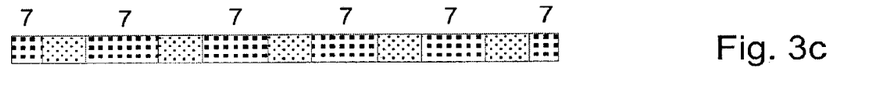

In FIG. 3c, the infrared remission image of the window security thread of FIG. 3b is outlined. In remission, likewise, a bright/dark modulation is shown, however, in remission the bright regions—just vice versa to the transmission image—lie in the regions between the windows 7, while the security thread appears darker in the windows 7.

In contrast, with a forged window security thread, which is formed by a periodical bright/dark print on the value document, in transmission and remission no such reversed (opposite in phase) bright/dark modulation would be observed. Rather, such a forged security thread would have at most a similar (equal-phase) bright/dark modulation in transmission and remission.

Figure 4A:
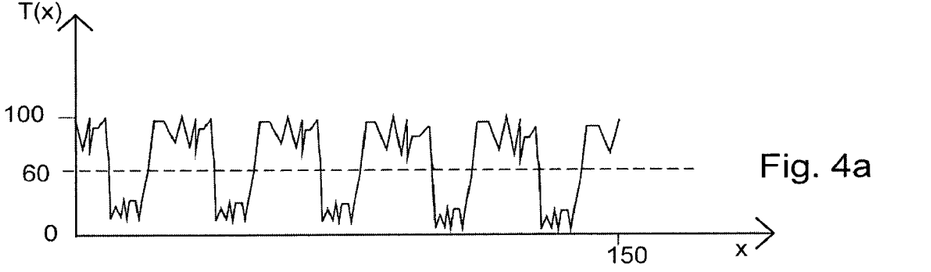
Figure 4B:
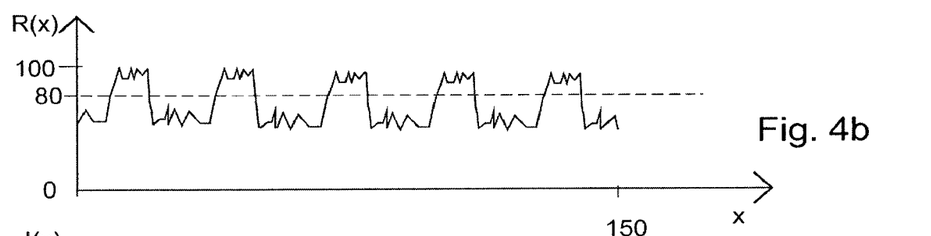

FIG. 4a shows the transmission course $T(x)$, FIG. 4b the remission course $R(x)$ of the security thread of FIGS. 3b, 3c along the longitudinal direction x of the security thread which was detected in the infrared spectral region.

Here, the remission image or transmission image of a stripe with a width of three pixels in the middle of the security thread is combined into one single remission course or transmission course by averaging the intensity of respectively three pixels lying side by side. The remission and transmission course respectively extend over a length of 150 pixels of the remission or transmission image, corresponding to the width of the value document along the x direction. The intensities of the two courses were respectively normalized to the maximum intensity and multiplied by 100, so that in both courses the brightest regions respectively have an intensity of 100. Additionally, in FIG. 4a the mean value of the transmission course is drawn in dashed lines, which is approximately 60, and in FIG. 4b the mean value of the remission course, which is approximately 80.

Figure 4C:
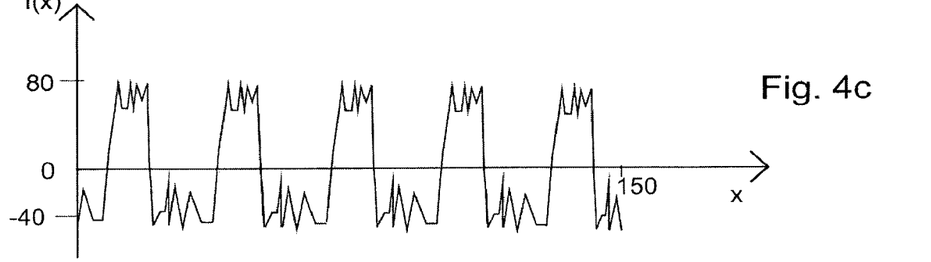

FIG. 4c shows a combination course $I(x)=R(x)-T(x)$ which is calculated subtracting pixel by pixel the transmission course from the remission course. The subtracting pixel by pixel leads to a strengthening of the two bright/dark modulations, so that the combination course $I(x)$ has an even more distinct bright/dark modulation.

Figure 4D:
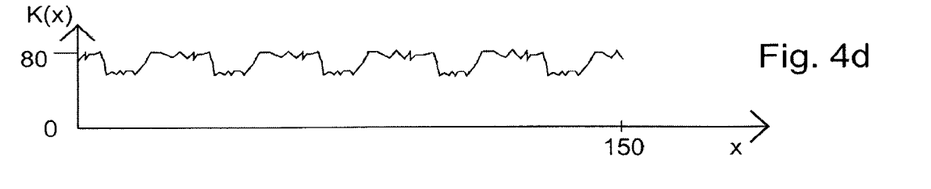

FIG. 4d shows a further combination course $K(x)=(R(x)+T(x))/2$ which is calculated by adding pixel by pixel the transmission course and the remission course. The added intensities, in this example, were halved after the addition to obtain the scale of a maximum of 100. The adding pixel by pixel leads to an attenuation of the two modulations, so that the combination course $K(x)$ has an only very low bright/dark modulation. Depending on the quality of the security thread, depending on the embedding in the value document substrate and depending on the detected spectral region, upon adding pixel by pixel there may even arise an elimination of the two bright/dark modulations.

For checking the authenticity of the security thread there can be checked the combination course $I(x)$ or the combination course $K(x)$ or both for their bright/dark modulation. In a first embodiment example, for this purpose the standard deviation of the respective combination course is formed along the longitudinal direction x of the security thread. In the example of FIG. 4a-d, for the combination course $I(x)$ there results a standard deviation of $Std(I)=60$ and for the combination course $K(x)$ a standard deviation of $Std(K)=20$. For example, for checking the authenticity there is then calculated the difference D of the two standard deviations $D=Std(I)-Std(K)$ and this difference $D=60-20=40$ is compared with a threshold which is for example 30. On account of the exceeding of $D>30$ in the present example the security thread would be evaluated as authentic.

Alternatively, the two standard deviations $Std(I)$ and $Std(K)$ can also be compared respectively individually with a threshold valid therefor and only when $Std(I)$ is above its threshold and at the same time $Std(K)$ is below its threshold, the security thread would be evaluated as authentic, otherwise as false.

Figure 5A:
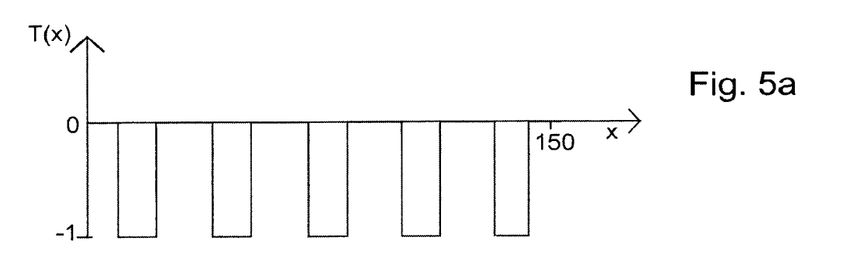
Figure 5B:
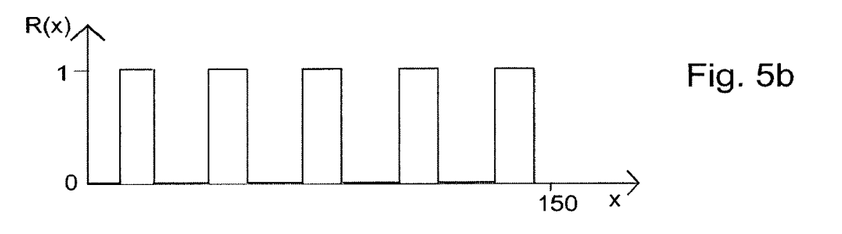

In a second embodiment example, for checking the authenticity the remission and transmission course are binarized. From the remission and transmission course there is respectively generated a binary intensity course whose intensities along the longitudinal direction of the value document can assume only two different values. The individual intensity values of the binary remission and transmission course along the longitudinal direction of the value document assume e.g. respectively only one of two binary values. The binarization can be effected, e.g. in that the remission or transmission course is compared with a threshold. This threshold can respectively be e.g. the mean value of the remission course or transmission course, hence in the transmission course of FIG. 4a the threshold 60 and in the remission course of FIG. 4b the threshold 80. If the intensity value at the respective position x lies above the first threshold, the associated intensity value of the binary remission or transmission course is set e.g. at the upper binary value. If the intensity value at the respective position x, however, does not lie above the first threshold, the associated intensity value of the binary remission or transmission course is set e.g. at the lower binary value. FIG. 5a shows the transmission course binarized in this fashion, the two binary values 0 and −1 being chosen and FIG. 5b shows the remission course binarized in this fashion, the two binary values 0 and 1 being chosen.

Figure 5C:
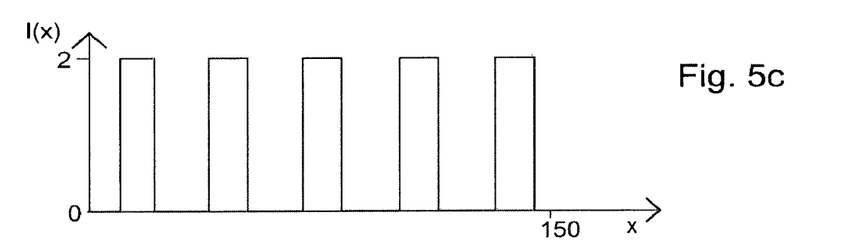

From the binarized remission course and the binarized transmission course by subtracting pixel by pixel the combination course $I(x)=R(x)-T(x)$ of FIG. 5c is obtained, which combination course has an increased modulation whose intensity values are 0 and 2. And by adding pixel by pixel there results the combination course $K(x)=T(x)+R(x)$ of FIG. 5d. This is continuously zero along the longitudinal direction x of the security thread, i.e. the two modulations of the binary remission course and binary transmission course eliminate themselves.

Figure 5D:
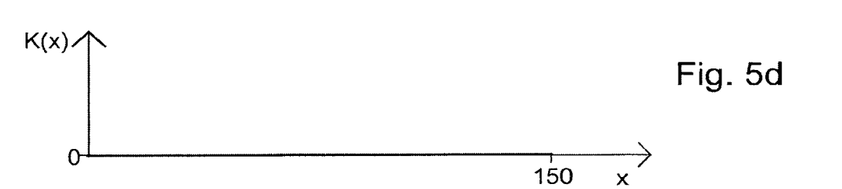

For checking the authenticity of the security element, in the second embodiment example, the sum of the intensity values of the combination courses $I(x)$ and $K(x)$ along the longitudinal direction x of the security element (from $x=0$ to $x=150$) is calculated respectively pixel by pixel and this sum is compared with a threshold. For the combination course $I(x)$, in the present example there results a sum of $$\sum I(x) = \sum_{x=1}^{150} (R(x) - T(x)) = 150$$

and for the combination course K(x) a sum of $$\sum K(x) = \sum_{x=1}^{150} (R(x) + T(x)) = 0$$

These two sums are respectively compared with a threshold, e.g. with the threshold T=90. As in the present case $\Sigma I(x) > T$ and $\Sigma K(x) < T$, the checked security thread is evaluated as authentic. If, however, either $\Sigma I(x) < T$ or $\Sigma K(x) > T$ or both are true, the security thread would be evaluated as forged.

The invention claimed is:

1. A method for checking the authenticity of a security element, the method comprising:
   capturing electromagnetic radiation remitted by the security element and transmitted through the security element with at least one sensor;
   generating a remission course corresponding to an intensity remitted along a longitudinal direction of the security element;
   generating a transmission course corresponding to an intensity transmitted along the longitudinal direction of the security element and
   checking the authenticity of the security element;
   wherein the step of checking the authenticity of the security element comprises:
   a) setting off the remission course and the transmission course are set off against each other pixel by pixel for determining a combination course along the longitudinal direction of the security element, and
   b) checking the combination course obtained by setting off pixel by pixel with regard to an intensity modulation along the longitudinal direction of the security element, and
   c) evaluating the authenticity of the security element in dependence on the intensity modulation of the combination course.

2. The method according to claim 1, the method further comprising:
   determining an identity of the value document prior to the step of checking the authenticity;
   carrying out the step of checking the authenticity of the security element the steps a), b) and c) in dependence on the identity of the value document.

3. The method according to claim 1, wherein said determining the combination course comprises adding the remission course along the longitudinal direction of the security element and the transmission course along the longitudinal direction of the security element to each other pixel by pixel.

4. The method according to claim 1, wherein said determining the combination course comprises subtracting the remission course along the longitudinal direction of the security element and the transmission course along the longitudinal direction of the security element from each other pixel by pixel.

5. The method according to claim 1, the method comprising:
   checking whether the remission course and/or the transmission course exceed an intensity modulation having a minimum modulation amplitude prior to the step of checking the authenticity, and
   proceeding to the step of checking the authenticity in the case that the remission course and/or the transmission course exceed the minimum modulation amplitude; and
   evaluating the security element as false in the case that the remission course and/or the transmission course do not exceed the minimum modulation amplitude.

6. The method according to claim 1, wherein the security element comprises a window security element.

7. The method according to claim 6, wherein the window security element is a window security thread equipped with a microlens grid.

8. The method according to claim 1, wherein said checking the combination course comprises:
   determining a standard deviation of the combination course along the longitudinal direction of the security element;
   comparing the standard deviation is compared with a threshold; and evaluating the security element as authentic or false in dependence on whether the standard deviation exceeds the threshold or does not exceed the threshold.

9. The method according to claim 1, wherein said generating the remission course comprises calculating a binary remission course by binarizing, and
   wherein said generating the transmission course comprises calculating a binary transmission course by binarizing;
   said binary remission course and said binary transmission course each having only two different intensity values along the longitudinal direction of the security element; and
   wherein said determining the combination course comprises setting off the binary remission course along the longitudinal direction of the security element against the binary transmission course along the longitudinal direction of the security element pixel by pixel.

10. The method according to claim 9, the method comprising checking the combination course determined from the binary remission course and the binary transmission course with regards to an intensity modulation along the longitudinal direction of the security element by:
    calculating a sum of intensity values of the combination course along the longitudinal direction of the security element pixel by pixel;
    comparing said sum with a threshold; and
    evaluating the security element as false or authentic in dependence on whether the calculated sum exceeds the threshold or does not exceed the threshold.

11. The method according to claim 1, the method further comprising:
    determining a first combination course along the longitudinal direction of the security element by subtracting the remission course and the transmission course from each other pixel by pixel; and
    determining a second combination course along the longitudinal direction of the security element by adding the remission course and the transmission course to each other pixel by pixel;
    checking both the first combination course and the second combination course with regard to their intensity modulation;
    evaluating the authenticity of the security element in dependence on the intensity modulation of the first combination course and in dependence on the intensity modulation of the second combination course.

12. The method according to claim 11, wherein said checking both the first combination course and the second combination course comprises:
  determining a first standard deviation for the first combination course; and
  determining a second standard deviation for the second combination course; and
  wherein said evaluating the authenticity of the security element is in dependence on the first and second standard deviation.

13. The method according to claim 11, the method further comprising:
  checking the first and/or the second combination course for an intensity modulation by comparing a location dependence of the respective combination course along the longitudinal direction of the security element with an expected location dependence for the security element; and
  evaluating the security element as authentic or false in dependence on the similarity of these location dependencies.

14. The method according to claim 11, wherein said generating the remission course comprises calculating a binary remission course;
  wherein said generating the transmission course comprises calculating a binary transmission course;
  wherein said determining the first and the second combination course uses the binary remission course and the binary transmission course,
  wherein said checking both the first combination course and the second combination course comprises calculating a first sum by adding the intensity values of the first combination course and a second sum by adding the intensity values of the second combination course, and
  wherein said evaluating the authenticity of the security element is carried out in dependence on the first and the second sum.

15. An apparatus for checking the authenticity of a security element, the apparatus comprising:
  at least one sensor for capturing the electromagnetic radiation remitted by the security element and transmitted through the security element, the at least one sensor further configured for generating a remission course corresponding to a remitted intensity and a transmission course corresponding to a transmitted intensity along a longitudinal direction of the security element and
  an evaluation device for checking the authenticity of the security element, the evaluation device configured for
  a) setting off the remission course and the transmission course along the longitudinal direction of the security element against each other pixel by pixel for determining a combination course, and
  b) checking the combination course obtained by setting off pixel by pixel with regard to an intensity modulation along the longitudinal direction of the security element, and
  c) evaluating the authenticity of the security element in dependence on the intensity modulation of the combination course.

16. A value-document processing apparatus for processing value documents and with an apparatus according to claim 15 which is configured for checking the authenticity of the security element of a value document.

17. The apparatus of claim 15, wherein the evaluation device is configured to carry out the authenticity checking of the security element in dependence on the identity of the value document prior to the authenticity checking of the security element.

* * * * *